US008628070B2

(12) United States Patent
Neubauer

(10) Patent No.: US 8,628,070 B2
(45) Date of Patent: Jan. 14, 2014

(54) DEVICE FOR FIXING OR MANIPULATING OBJECTS

(75) Inventor: Hannes Neubauer, Hildesheim (DE)

(73) Assignee: Hannes Neubauer, Hildesheim (DE)

( * ) Notice: Subject to any disclaimer, the term of this patent is extended or adjusted under 35 U.S.C. 154(b) by 326 days.

(21) Appl. No.: 12/919,504

(22) PCT Filed: Feb. 24, 2009

(86) PCT No.: PCT/DE2009/000244

§ 371 (c)(1), (2), (4) Date: Nov. 22, 2010

(87) PCT Pub. No.: WO2009/106050

PCT Pub. Date: Sep. 3, 2009

(65) Prior Publication Data

US 2011/0057372 A1 Mar. 10, 2011

(30) Foreign Application Priority Data

Feb. 26, 2008 (DE) ........................ 10 2008 011 220

(51) Int. Cl.

| | |
|---|---|
| ***B25B 1/00*** | (2006.01) |
| ***B25B 1/20*** | (2006.01) |
| ***B23Q 1/25*** | (2006.01) |
| ***B25B 1/02*** | (2006.01) |
| ***B25B 7/02*** | (2006.01) |

(52) U.S. Cl.

USPC ........ 269/55; 269/43; 269/3; 269/6; 269/143; 81/303; 81/304; 81/305; 81/306

(58) Field of Classification Search

USPC ........ 269/55, 3, 6, 95, 143, 249; 29/267, 268; 72/409.12; 81/303, 304, 305, 306, 311

See application file for complete search history.

(56) References Cited

U.S. PATENT DOCUMENTS

| | | | | |
|---|---|---|---|---|
| 1,095,054 | A * | 4/1914 | Wiesenfeld | 294/118 |
| 1,365,227 | A | 1/1921 | Clark | |
| 1,539,526 | A | 5/1925 | Swickard | |
| 2,507,368 | A * | 5/1950 | Carlson | 294/16 |
| 2,643,151 | A * | 6/1953 | Zupancic | 294/118 |
| 4,725,049 | A | 2/1988 | Cantarinhas | |
| 5,327,802 | A * | 7/1994 | Yu | 81/312 |
| 5,588,689 | A * | 12/1996 | Ochs | 294/118 |
| 6,145,823 | A | 11/2000 | Moushon et al. | |
| 7,144,003 | B1 * | 12/2006 | Meade | 269/43 |
| 7,237,425 | B1 * | 7/2007 | Wadsworth et al. | 269/43 |

FOREIGN PATENT DOCUMENTS

| | | | |
|---|---|---|---|
| DE | 3739669 | A1 | 6/1989 |
| DE | 202005006197 | U1 | 7/2005 |

OTHER PUBLICATIONS

International Search Report for PCT/DE2009/000244 mailed on Jun. 25, 2009.

* cited by examiner

*Primary Examiner* — Lee D Wilson
*Assistant Examiner* — Seahee Yoon
(74) *Attorney, Agent, or Firm* — Norman B. Thot

(57) ABSTRACT

A device for the temporary fixing or manipulation of objects including a first head with a front active face and a rear active face and a second head with a front active face and a rear active face. The front and rear active faces of the first head are movable relative to one another and the front and rear active faces of the second head are movable relative to one another. The rear active face of the first head is immovably connected to the front active face of the second head. The device also includes a force mechanism for introducing an active force to the first and second heads.

27 Claims, 7 Drawing Sheets

DEVICE FOR FIXING OR MANIPULATING OBJECTS

CROSS REFERENCE TO RELATED APPLICATIONS

This application is a U.S. National Phase application under 35 U.S.C. §371 of International Application No. PCT/DE2009/000244, filed on Feb. 24, 2009, and claims benefit to German Patent Application No. DE 10 2008 011 220.8, filed on Feb. 26, 2008. The International Application was published in German on Sep. 3, 2009 as WO 2009/106050 A1 under PCT Article 21 (2).

FIELD

The invention relates to a device intended for the temporary fixing or manipulation of objects with at least a first and a second head, each head having two front and rear active faces, which can be moved relative to one another and enclose the object between them during fixing or manipulation.

BACKGROUND

Conventional devices for the temporary handling, fixing or manipulation of items, for example by transmitting a deformation force, include, for example, tongs or shears.

Tongs are a two-membered tool, in which the active faces are configured for gripping, forming, deforming, cutting or in any other manner. Tongs generally consist of three regions, the lever arms having a respective handle, the joint and the tong head with the active faces. Generally, tongs are equipped with two-sided lever arms, which are connected to one another by a joint. As a rule, the handles in this case form the longer arms and the shorter arms form the tong head. According to the lever principle, the manual force applied to the handles is reinforced and transmitted by means of the tong head to an item.

Differing from the basic type of tongs, there are numerous special forms, some of which are also widely used, such as, for example, vice-grip locking pliers based on the knee lever principle. For example, configurations as universal pliers, pipe pliers, water pump pliers, side cutters, circlip pliers, forge tongs, flat pliers, hole punches or piston ring pliers are known.

Tongs are also widely used in the medical sector. By way of example, swab forceps can be mentioned here, which have a lock above the handle in order to fix the object grasped. In contrast to swab forceps, Magill forceps have a lateral angled portion of the gripping arms.

Furthermore, countless special tongs have been created for a wide variety of applications, such as, for example, grill tongs.

A generic device for manipulating items, also described as tongs, is known in the form of a staple remover tool, in which two pointed active faces each form a head. The front active faces of the parallel heads are, like their rear active faces, connected to one another in one piece, so the front and rear active faces can also be called a single, divided or penetrated active face.

The advantage of a plurality of heads which can be achieved in practice is primarily that by means of a plurality of engagement points determined by each head and spaced apart from one another, a possible torque about an engagement point can be better absorbed and thereby the handling, in particular of large items, can be substantially facilitated.

Devices, in particular tongs, with a plurality of heads, however, have the common drawback that the front and rear active faces of adjacent heads always move in parallel. Therefore if the object to be fixed or to be manipulated has a shaping that is not completely flat and, in addition, of a constant material thickness, the transmission of the active force is substantially limited to a single head, so the advantageous effect does not occur in the desired manner.

While the active face is rigidly connected to the lever arm in conventional tongs, DE 20 2005 006 197 U1, in comparison, describes tongs with two adjustable tong heads, it being possible to bring the tong mouths into positions which differ from one another, namely, in each case, into an opened or closed state. To thus provide tongs with a double tong head, in which two lever arms which can be adjusted to the front or rear and two tong heads are present, two tong heads can be operated by means of the handles in order to open or close a tong mouth of two respective tong jaws, the opening and closing of the tong mouth being able to be carried out simultaneously by the two respective tong jaws.

Tongs known as vice-grip locking pliers can be adjusted using an adjusting screw to an opening width and clamped in this position on the workpiece. The vice-grip locking pliers are released by an additional lever, which in turn overcomes the dead centre. U.S. Pat. No. 7,237,425 describes double tongs based on this principle of vice-grip locking pliers, the levers of which are connected in each case to a pressure plate, can be actuated independently and can be pressed against a common abutment.

These double-headed tongs are in fact an interchangeable head, because, in each case, only one head is ready to function, so only one alternative application possibility is produced.

FIGS. 1 and 2 show a plan view and a front view of conventional tongs 1 with two heads 2, 3. The heads 2, 3 are in this case arranged parallel to one another in such a way that the active faces 4, 5, 6, 7, which are configured as flat jaws here, always carry out a parallel, in other words matching, movement. In this case, a respective lever arm 8 is associated with the two upper active faces 4, 6 and a further lever arm 9 is associated with the two lower active faces 5, 7 of the parallel heads 2, 3 in relation to an object 10. The advantage of tongs 1 of this type is the two engagement points 11, 12, which allow secure handling of the object 10, in particular better transmission of occurring torques.

However, as can clearly be seen in FIG. 2, this advantage is not achieved in those objects 10 which, in the region of the two heads 2, 3, in each case have a different material thickness d, D, because a non-positive connection can then only be realised in the region of just one of the two heads 2, 3.

SUMMARY

An aspect of the present invention is to provide a device which allows a reliable transmission of the active force to the object using all of the active faces.

In an embodiment, the present invention provides device for the temporary fixing or manipulation of objects including a first head with a front active face and a rear active face and a second head with a front active face and a rear active face. The front and rear active faces of the first head are movable relative to one another and the front and rear active faces of the second head are movable relative to one another. The rear active face of the first head is immovably connected to the front active face of the second head. The device also includes a force mechanism for introducing an active force to the first and second heads.

BRIEF DESCRIPTION OF THE DRAWINGS

Exemplary embodiments of the invention are described in greater detail, making reference to the drawings, in which.

DETAILED DESCRIPTION

Figure 1:
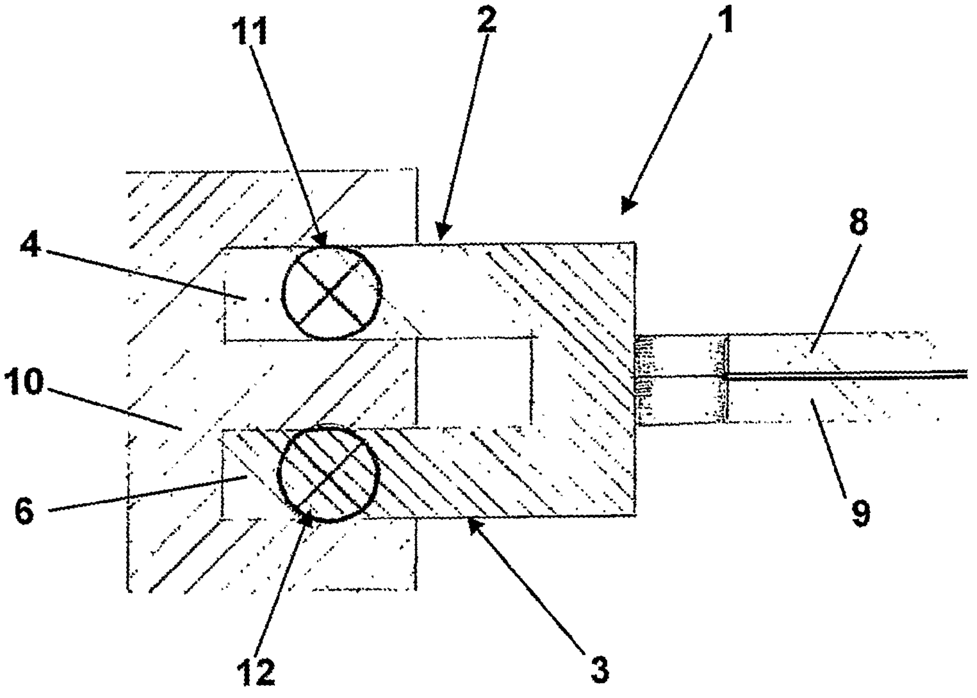
Fig. 1 (PRIOR ART)
FIG. 1 shows a schematic diagram of conventional tongs with two heads in a plan view.
Figure 2:
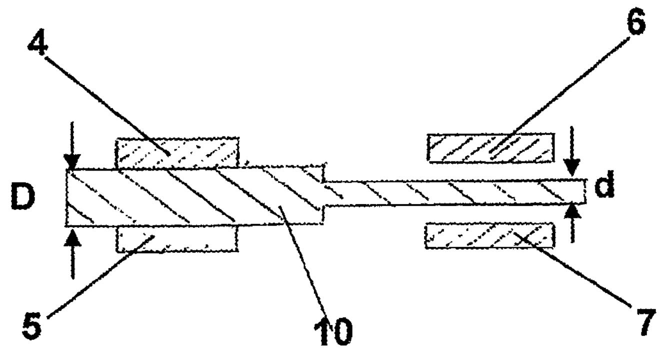
Fig. 2 (PRIOR ART)
FIG. 2 shows the tongs of FIG. 1 in a front view.

In an embodiment, the present invention provides a device in which the respective active faces of the adjacent heads are connected to one another in a series arrangement in such a way that the rear active face of the first head is immovably connected to the front active face of the second head. Accordingly, transmission of the active force to the object takes place in an optimal manner when the active faces of the two heads do not move in parallel as in conventional device, in other words in a path-controlled manner, but rather the heads are connected in a series arrangement and therefore a force compensation takes place between the two heads. The application of the device according to the invention is thus not limited to tongs to hold or manipulate the movement of items. Rather, the device opens up diverse application possibilities as a lifting appliance in conjunction with automated or mechanised systems, for example as a crane hook or gripping device, in shear arm manipulators but also as a bench vice or else a kitchen appliance. In an embodiment, the first arm is exclusively connected to the front active face of the first head and the second arm is exclusively connected to the rear active face of the second head. In the sense of the present invention, the front and rear active faces are to be taken to mean an arrangement which is opposing in relation to the object, in other words a two-sided arrangement.

Compensation of the active force takes place here by means of the connecting element, by means of which the rear active face of the first head and the front active face of the second head are immovably connected, and, specifically, independently of the respective opening angle of the two heads, so even objects of the type where the thickness differs in the region of the various heads, or curved faces which do not have a common plane in the region of the heads can be reliably loaded and with the same active force.

The connecting element may have virtually any shaping, which is suitable to transmit the active force between the active faces of the two heads. In this case, the connecting element is not directly actuated, but merely indirectly loaded with the active force. On the other hand, a modification, in which the connecting element is arranged in parallel, at least in portions, in particular coaxial to a joint axle of the joint and thus allows an extremely compact structural shape, is possible.

In accordance with another embodiment, the connecting element may have a receiver for a joint axle of the joint, so the connecting element, as the central element, thus connects the active faces and has the joint axle, so only the arms still have to be supplemented by the associated active faces. Structural outlay can thus be further reduced.

The active faces could be movably arranged in parallel relative to one another, as is desirable in a bench vice and also in many holding devices and fixing devices. For this purpose, a parallelogram guide may be provided, for example. On the other hand, another particularly simple modification is realised in that the active faces are arranged so as to be pivotally movable with respect to one another.

The invention may also be advantageously realised in variants which merely have a one-sided lever arm, so the joint is thus arranged on an end region of the lever arm opposing the active faces. Such an embodiment may be used in applications in which the increase in force in accordance with the lever principle is not necessary. On the other hand, modifications are also possible, in which the arms are in each case configured as two-sided lever arms. As a result, an increase in the force can be achieved and the invention can therefore be used in virtually all tongs, shears or similar devices.

To increase the force, according to a further modification the joint may be configured as a multi-joint, as is used in bolt cutters, for example, so a virtually matching severing or cutting force is made possible according to this embodiment of the invention, for example owing to the parallel introduction.

Furthermore, the device may have an adjusting means for fixing the active faces in a particular desired relative position. As a result, according to the principle of vice-grip locking pliers, the active force required to hold or fix the object can be held by the adjusting means, so a temporary connection is achieved without a further manual introduction of force. Handling of the device is thus substantially facilitated.

In another embodiment, in which the joint has a joint axle and a plurality of joint receivers to fix the relative spacing of at least one active face from the joint in various positions, the opening width between the active faces can be adjusted and the active faces thus placed virtually in parallel on the object. The transmission of the active force may be substantially optimised by the flat contact of the active faces which is thereby achieved.

In this case, the device may be configured both for manipulation, in other words for deformation or actuation of the object, and also to temporarily hold an item, configurations of the device being particularly suitable for practical use, in which the device is configured as tongs, universal pliers, forge pliers or pointed pliers, for example.

The device may also be configured as a lifting device intended particularly for industrial applications, so the device is not only suitable for manual actuation, but also opens up diverse possibilities in automated applications. Applications for robot grippers as well as scissor lift devices are conceivable.

As the movement of the active faces in some embodiments of the invention is not path-dependent, in other words, takes place in parallel, the heads do not necessarily move simultaneously when opening and closing in practice. In order to facilitate the opening of the two heads, the active faces may thus be movably arranged with respect to one another counter to the restoring force of at least one spring element, so the opening movement is assisted by the spring element, preferably the spring element of the respective head and takes place virtually simultaneously.

Furthermore, at least one active face may be arranged on a gripping jaw which can be fixed in various positions to thus be able to adjust an orientation which can be brought into agreement with the main extent of the object.

For adaptation to different surface compositions of the object or to compensate the closing plane that is offset relative to the main extent plane of the object of the pair-wise active faces of the two heads, at least one active face of the first head may have a rounded portion or angled portion at its edge region of the contact face remote from and/or facing the active faces of the second head. Owing to the rounded contact faces, the holding force can be optimised and simultaneously an undesired impairment of the surface of the object can be reliably avoided.

In another embodiment, the device has a stop limiting the opening width between the active faces of at least one head. As a result, the opening width is limited when releasing the active faces from the object, so the entraining effect occurs in good time for the head opening last. For this purpose, the stop can be fixed as necessary in different positions and can be adjusted steplessly, for example.

The device could be used to transmit an opening force to the object, for example to open securing rings. On the other hand, a modification is particularly expedient in which the active force is directed in the action direction of the respective opposing active face of the same head, so a holding or deformation force can be transmitted to the object enclosed between the active faces.

The heads can be configured to be matching or in a mirror-symmetrical form. A further particularly expedient modification is achieved if the heads have a different shaping of their active faces.

As a result, a plurality of operations can be combined in the device by the configuration of the device and the implementation can thereby be substantially facilitated. In particular, in the device, one head can be intended for fixing and the other head intended for cutting the object.

Figure 3:
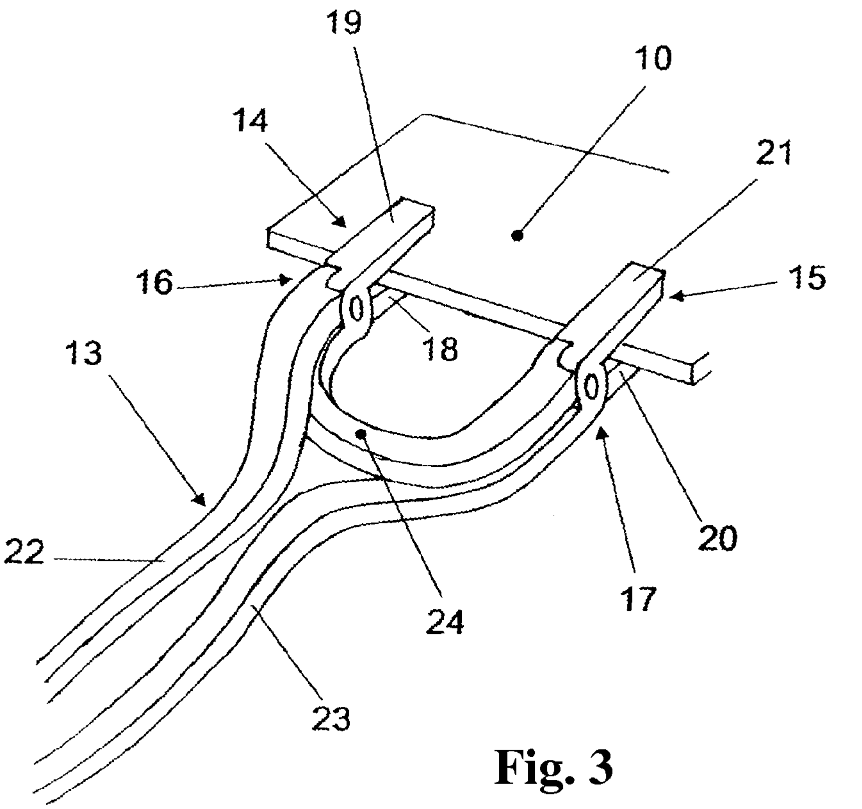
FIG. 3 shows a perspective view of an embodiment of the invention configured as forge tongs.

FIG. 3 shows a device in accordance with an embodiment of the invention that is configured as tongs. This device 13 for temporarily fixing the object also has a first head 14 and a second head 15. Two front and rear active faces 18, 19, 20, 21 connected by a joint 16, 17, movable relative to one another and enclosing the object 10 between them during the fixing or manipulation, are associated with each head 14, 15. However, in this case, a first arm 22 is exclusively connected to the front active face 18 of the first head 14, and a second arm 23 is exclusively connected to the rear active face 21 of the second head 15. The connection of the rear active face 19 of the first head 14 to the front active face 20 of the second head 15, on the other hand, is achieved by a connecting element 24, which is realised by a one-piece configuration of the active faces 19, 20 and the connecting element 24. A series arrangement is thus produced for the respective active faces 18, 19, 20, 21 of the adjacent heads 14, 15, so compensation of the active force takes place automatically between the two heads 14, 15.

Figure 4:
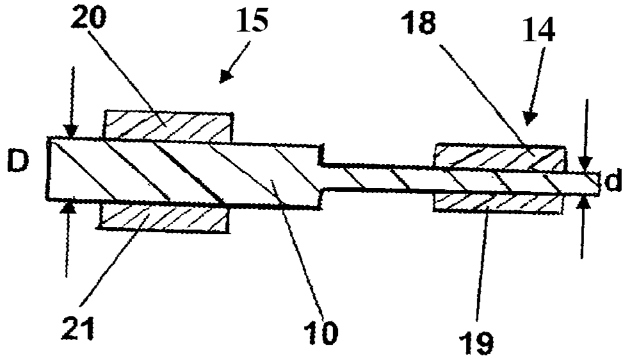
FIG. 4 shows the forge tongs of FIG. 3 in a front view.
Figure 5:
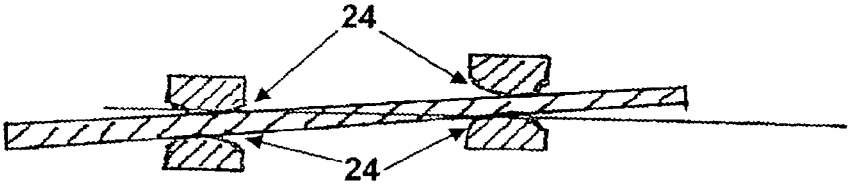
FIG. 5 shows a device configured as tongs with a rounded portion of the contact face.

In particular, in this case, no force-guided parallel movement of the active faces 18, 19, 20, 21 takes place so, as can be seen in FIGS. 4 and 5, a reliable transmission of the active force is even produced by a uniform contact of all the active faces 18, 19, 20, 21 on the object 10 when the latter, in the region of the two heads 14, 15, in each case has a different material thickness d, D, or, as shown in FIG. 5, has an inclined course relative to a plane of the joints 16, 17. For this purpose, the variant of the active faces 18, 19, 20, 21 of the two heads 14, 15 shown in FIG. 5 has a rounded portion 24 on its edge regions of its contact faces remote from and facing one another.

Figure 6:
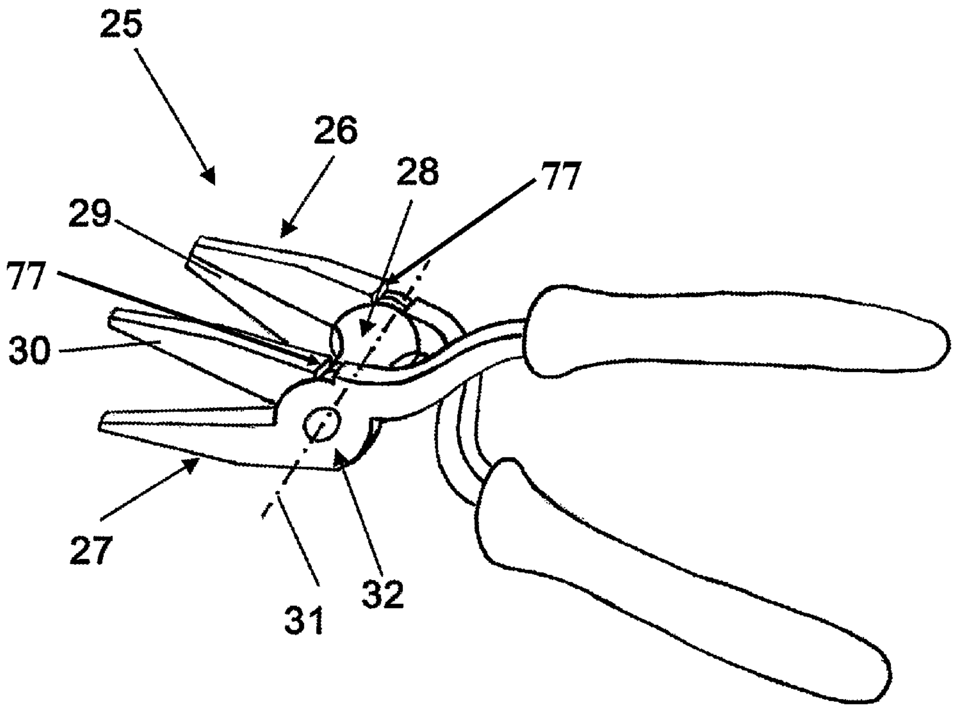
FIG. 6 shows a perspective view of a further device configured as pointed pliers.

A further device 25 configured as pointed pliers can be seen in FIG. 6 in a perspective view. A position is shown during the opening of the device 25 in which, because of the series arrangement according to the invention, the parallel heads 26, 27 do not open simultaneously, for example, but consecutively. A connecting element 28, which immovably connects the rear active face 29 of the first head 26 to the front active face 30 of the second head 27, is configured in this case as a moulded part arranged coaxially with respect to a joint axle 31 of the joint 32. FIG. 6 also shows the device with a stop 77 limiting the opening width between the active faces of at least one head. As a result, the opening width is limited when releasing the active faces from the object, so the entraining effect occurs in good time for the head opening last. For this purpose, the stop 77 can be fixed as necessary in different positions and can be adjusted steplessly, for example.

Figure 7:
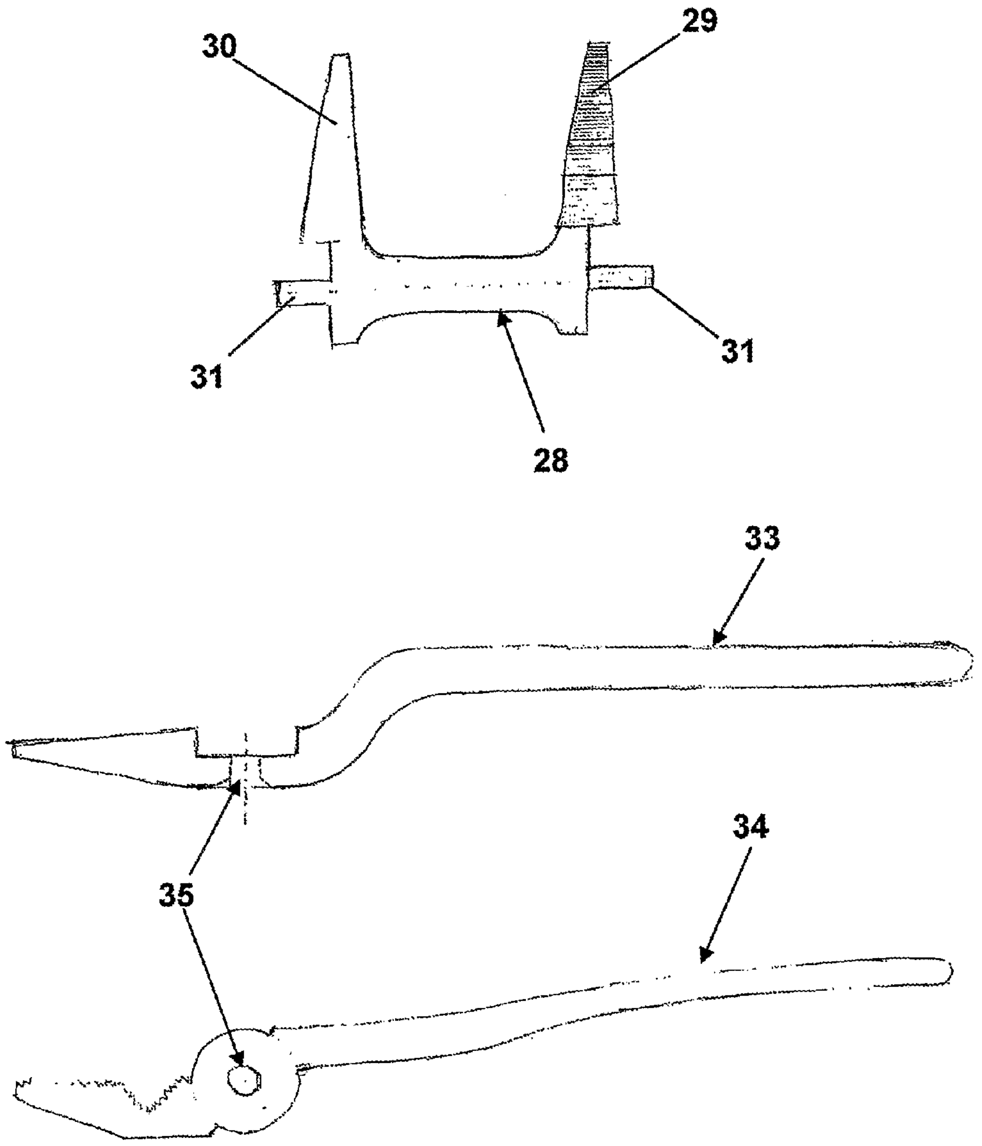
FIG. 7 shows the components of the pointed pliers of FIG. 6.

The individual components of the device 25 shown in FIG. 6 are shown in FIG. 7 in a plan view or a side view. The connecting element 28 configured as a moulded part with the rear active face 29 moulded thereon of the first head 26 and the front active face 30 of the second head 27 can be seen. Furthermore, the connecting element 28 already carries the joint axle 31 to receive the two arms 33, 34, which for this purpose in each case has a corresponding opening 35 intended to receive the joint axle 31.

Figure 8:
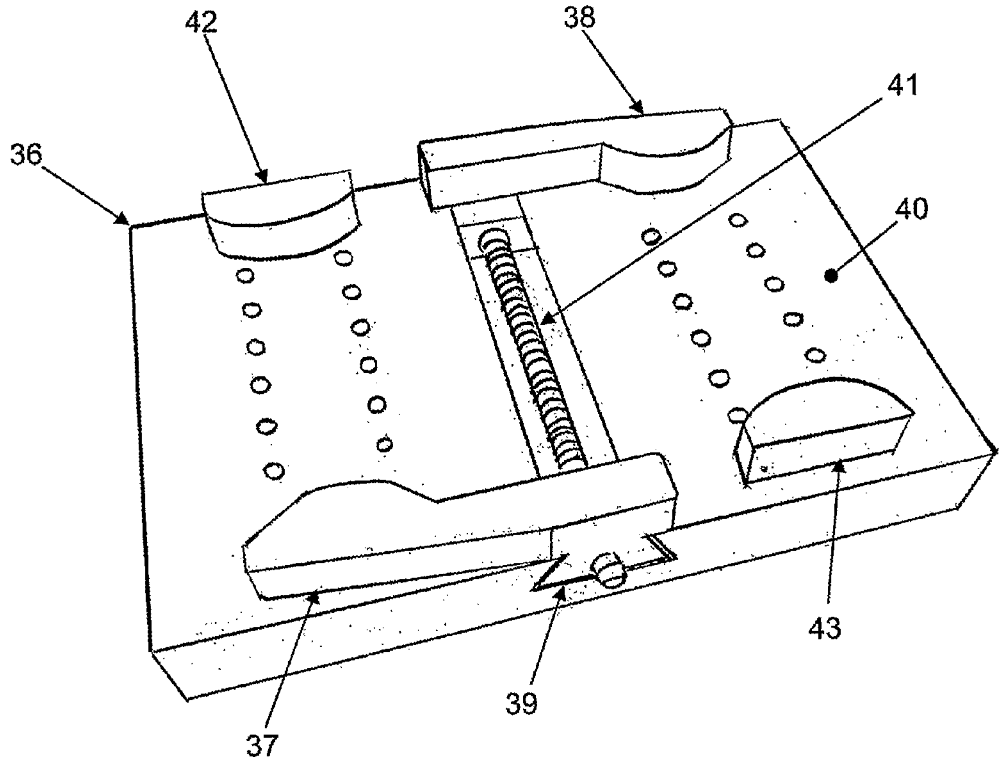
FIG. 8 shows a schematic diagram of a further device with two active faces which can be displaced relative to one another by means of a threaded spindle, in a perspective view.

FIG. 8 shows a further configuration of the device 36 according to an embodiment of the invention in a perspective view, in which the active faces 37, 38, which can be moved relative to one another, are displaceably arranged in a guide 39. The guide 39 is provided, for this purpose, on a connecting element 40 of the device 36, which has a groove recess for the movable active faces 37, 38, which are displaceably arranged relative to one another by means of a threaded spindle 41. The remaining active faces 42, 43 forming the abutment can be arranged in a fixed or removable manner in various positions on this connecting element 40.

Figure 9:
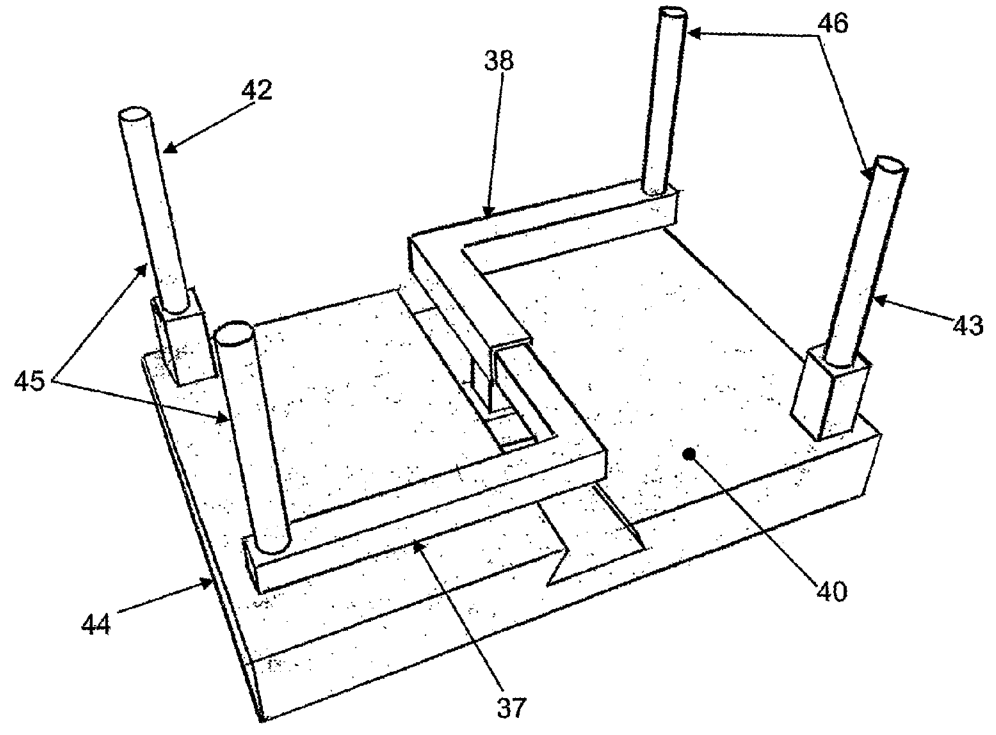
FIG. 9 shows a schematic diagram of a further device with active faces which can be displaced relative to one another by means of a pneumatic system, in a perspective view.

A further device 44 is also constructed in a similar manner and is shown in more detail with the aid of a schematic diagram in FIG. 9. Arranged on the connecting element 40 here are the active faces 37, 38, which are equipped with rod-like projections and can be telescopically displaced into one another, and the further active faces 42, 43 fixed on the connecting element 40, the active force being introduced by means of a pneumatic drive, not shown. Because of the z-shaped configuration of the active faces 37, 38, in each case, a movable active face 37, 38 together with an immovable active face 42, 43 being used as an abutment, form a head 45, 46 in a floating arrangement, so an automatic force compensation of the force introduced takes place between the heads 45, 46.

Figure 10:
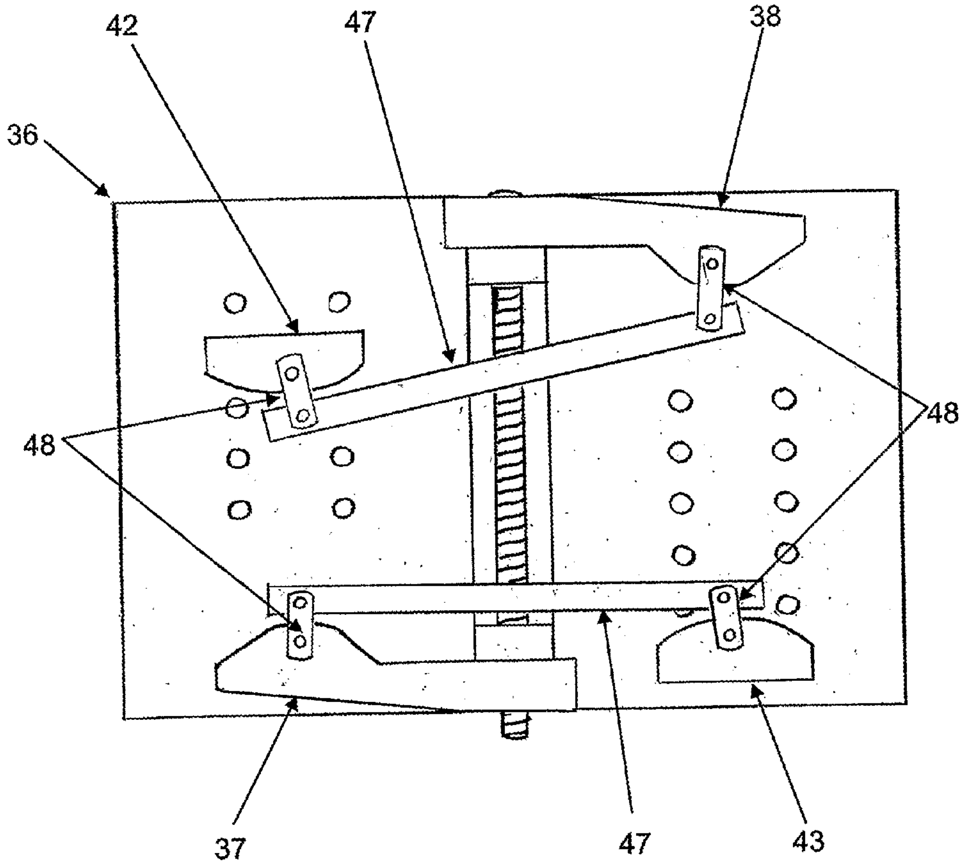
FIG. 10 shows a modification of the device according to FIG. 8 in a plan view.

FIG. 10 shows a modification of the device 36 according to FIG. 8 in a plan view. The active faces 37, 38, which can be moved relative to one another, are in this case additionally connected pair-wise to the active faces 42, 43 of the adjacent heads, by a respective moulded body 47 which can be placed against the object on the front or rear thereof. For this purpose, the moulded body is, in particular, movably arranged on the active faces 37, 38, 42, 43 by means of a respective joint 48. An excavator shovel to receive bulk goods, in which the shovel halves, which are pivotally movable with respect to one another, are respectively formed by one of the moulded bodies 47, can be realised, for example, with this device 36 shown here only in principle.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A device for the temporary fixing or manipulation of objects, the device comprising:
- a first head including a front active face and a rear active face, the front active face and the rear active faces of the first head being movable relative to one another;
- a second head including a front active face and a rear active face, the front active face and the rear active faces of the second head being movable relative to one another; and
- a force mechanism for introducing an active force to the front active face of the first head and the rear active face of the second head;
- wherein,
- the rear active face of the first head is immovably connected to the front active face of the second head in a series arrangement by a connecting element so that a force compensation of the active force takes place between the first head and the second head, and
- an opening width of the first head and the second head are independent of each other.

2. The device as recited in claim 1, wherein the force mechanism includes two arms.

3. The device as recited in claim 1, wherein the force mechanism includes lever arms configured for a manual introduction of the active force.

4. The device as recited in claim 1, wherein the force mechanism includes a threaded spindle configured to be driven by an electric motor.

5. The device as recited in claim 1, wherein the force mechanism includes at least one of a pneumatic drive and a hydraulic drive.

6. The device as recited in claim 1, wherein the respective active faces that are movable relative to one another are connected by a joint.

7. The device as recited in claim 1, wherein at least one active face is displaceably disposed in a guide.

8. The device as recited in claim 1, wherein the rear active face of the first head is immovably connected to the front active face of the second head by a connecting element.

9. The device as recited in claim 8, wherein at least one of the rear active face of the first head and the front active face of the second head is adjustable to one of a plurality of fixed positions on the connecting element, and
- wherein the connecting element includes a guide and at least one of the front active face of the first head and the rear active face of the second head is diplaceably arranged in the guide.

10. The device as recited in claim 8, wherein the respective active faces that are movable relative to one another are connected by a joint, and wherein at least a portion of the connecting element is disposed in parallel with the joint.

11. The device as recited in claim 8, wherein the respective active faces that are movable relative to one another are connected by a joint, and wherein the connecting element includes at least one of a joint axle and a receiver for the joint axle of the joint.

12. The device as recited in claim 6, wherein the respective active faces are movable relative to one another in a pivotal motion through use of the joint.

13. The device as recited in claim 3, wherein each of the lever arms are two-sided lever arms.

14. The device as recited in claim 6, wherein the joint is a multi-joint.

15. The device as recited in claim 1, further comprising an adjusting element for fixing the active faces in desired relative position.

16. The device as recited in claim 6, wherein the joint includes a joint axle and a plurality of joint receivers configured to selectively fix the relative spacing of at least one active face with respect to another.

17. The device as recited in claim 1, wherein the device is configured as tongs.

18. The device as recited in claim 1, further comprising a spring configured to apply a restoring force to at least one of the active faces.

19. The device as recited in claim 1 wherein at least one of the active faces is disposed on a gripping jaw that is fixable in a plurality of positions.

20. The device as recited in claim 1 wherein at least one active face of the first head includes a contact face and a rounded or angled portion on an edge region of the contact face, the edge region being remote from or facing the second head.

21. The device as recited in claim 1 further comprising a stop corresponding to at least one active face configured to limit an opening width between the at least one active face and a respective opposing active face.

22. The device as recited in claim 1, wherein the device is configured such that an active force directed to a corresponding active face is directed of the respective opposing active face of the corresponding head.

23. The device as recited in claim 1, wherein the active faces of the first head have a different shape from the active faces of the second head.

24. The device as recited in claim 1, further comprising at least one molded body attached to each of the front active faces or the rear active faces, the molded body being configured to be placed against the object.

25. The device as recited in claim 24, wherein the at least one molded body is at least one of flexible and resilient.

26. The device as recited in claim 24, wherein the molded body is movably attached to each of the corresponding active faces with a respective joint.

27. The device as recited in claim 24, wherein the device is configured as an excavator shuffle configured to receive bulk goods, and wherein each molded body is in the form of a shovel half.

* * * * *